US012042825B2

(12) United States Patent
Siltanen et al.

(10) Patent No.: US 12,042,825 B2
(45) Date of Patent: Jul. 23, 2024

(54) ACCESS SOLUTION FOR CONVEYOR SYSTEMS

(71) Applicant: Kone Corporation, Helsinki (FI)

(72) Inventors: Sanni Siltanen, Helsinki (FI); Henri Sainio, Helsinki (FI); Seppo Valliovuo, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 17/968,137

(22) Filed: Oct. 18, 2022

(65) Prior Publication Data

US 2023/0042763 A1 Feb. 9, 2023

Related U.S. Application Data

(63) Continuation of application No. PCT/FI2020/050316, filed on May 13, 2020.

(51) Int. Cl.
*B07C 3/12* (2006.01)
*B07C 3/08* (2006.01)

(52) U.S. Cl.
CPC ................ *B07C 3/12* (2013.01); *B07C 3/082* (2013.01)

(58) Field of Classification Search
CPC ....... B07C 3/12; B07C 3/082; G07C 9/00896; G07C 9/20
See application file for complete search history.

(56) References Cited

U.S. PATENT DOCUMENTS 8,508,332 B2 * 8/2013 Jones ................. G07C 9/00309 340/5.2
8,770,350 B2 * 7/2014 Wilke ................ G07C 9/00896 187/247
9,437,061 B2 * 9/2016 Mehl ........................ G07C 9/28
9,850,093 B2 * 12/2017 DePaola ............ G07C 9/00896
2013/0272506 A1 10/2013 Hannu
(Continued)

FOREIGN PATENT DOCUMENTS

CN 101578228 A 11/2009
CN 102452589 A 5/2012
(Continued)

OTHER PUBLICATIONS

International Search Report for International Application No. PCT/FI2020/050316 dated Dec. 2, 2020.
(Continued)

*Primary Examiner* — Patrick H Mackey
(74) *Attorney, Agent, or Firm* — Harness, Dickey & Pierce, P.L.C.

(57) ABSTRACT

The invention relates to a method for determining an access right to an entity of a conveyor system, wherein it is: received data comprising data representing an identity of a wireless key and data representing a location of the wireless key; detected that the wireless key resides in a predefined location; identified the conveyor system and the entity on a basis of data representing the predefined location; determined status of an identified conveyor system; determined an access right with the wireless key to the entity; and generated a control signal to cause one of the following: (i) a grant of an access to the entity, (ii) a refusal of an access to the entity. The invention also relates to a network node, a computer program product and to a conveyor system.

26 Claims, 3 Drawing Sheets

(56) References Cited

U.S. PATENT DOCUMENTS

| | | | | |
|---|---|---|---|---|
| 2018/0158267 | A1 | 6/2018 | Kontturi | |
| 2019/0047817 | A1* | 2/2019 | Salmikuukka | B66B 1/468 |
| 2019/0276272 | A1* | 9/2019 | Cortona | G07C 9/215 |
| 2020/0126337 | A1 | 4/2020 | Paul | |
| 2020/0134953 | A1* | 4/2020 | Li | H04W 12/08 |
| 2020/0140233 | A1 | 5/2020 | Kallioniemi et al. | |
| 2022/0348437 | A1* | 11/2022 | Friedli | G06K 7/10821 |

FOREIGN PATENT DOCUMENTS

| | | | |
|---|---|---|---|
| CN | 105502111 | B | 12/2017 |
| CN | 109484936 | A | 3/2019 |
| CN | 109983511 | A | 7/2019 |
| CN | 110023223 | A | 7/2019 |
| CN | 110065862 | A | 7/2019 |
| KR | 20180129003 | A | 12/2018 |
| WO | 2011015895 | A1 | 2/2011 |
| WO | WO-2019/063406 | A1 | 4/2019 |
| WO | WO-2022253421 | A1 * | 12/2022 |

OTHER PUBLICATIONS

Written Opinion for International Application No. PCT/FI2020/050316 dated Dec. 2, 2020.
Extended European Search Report dated Jun. 7, 2023 issued in corresponding European Appln. No. 20935496.8.
Chinese Office Action, dated Mar. 27, 2024, issued in Chinese Patent Application No. 202080100713.9.

* cited by examiner

ACCESS SOLUTION FOR CONVEYOR SYSTEMS

CROSS-REFERENCE TO RELATED APPLICATION

This application is a continuation of PCT International Application No. PCT/FI2020/050316 which has an International filing date of May 13, 2020, the entire contents of which are incorporated herein by reference.

TECHNICAL FIELD

The invention concerns in general the technical field of conveyor systems. More particularly, the invention concerns access solution to the conveyor systems.

BACKGROUND

Conveyor systems, like elevators or escalators, comprise spaces that may only be accessed by authorized persons, such as technicians. Such spaces may e.g. be elevator cars, shafts and external parts of an elevator car accessible e.g. through a roof door and control units residing behind locked doors, such as MAP (Maintenance Access Panel). In addition to spaces access to some systems belonging to the conveyor system, such as a user interface, or e.g. its configuration, may be limited. The access is limited by arranging a lock to respective entries, such as to doors, of the space or the system in question. Traditionally the lock has been a mechanical lock which is operative with a dedicated physical key the technicians are carrying with.

More sophisticated locking solutions are based on electric locks which are configured to operate through an electromagnetic interaction, such as with short range wireless communication. For example, the electric lock may operate as a reader device which may communicate with a wireless key when the wireless key is brought in a vicinity of the reader device. The vicinity may be defined by the electromagnetic technology applied to the system. In response to the interaction the lock is opened if the authorization procedure indicates that the wireless key allows the access to the entity in question. The wireless key may be in a form of a tag or a card, and configured to implement the wireless technology in question.

The above described prior art solutions have a disadvantage that they are tied to the above mentioned devices being either physical or electric. This also means that the technicians need to have the key being either physical or wireless with him/her in order to be capable of unlocking the lock and in that manner to access the entity, such as the space or the system, in question.

Hence, there is need to develop further solutions to provide freedom for accessing the conveyor system by authorized persons.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, a network node, a computer program product and a conveyor system for determining an access right.

The objects of the invention are reached by a method, a network node, a computer program product and a conveyor system as defined by the respective independent claims.

According to a first aspect, a method for determining an access right to an entity of a conveyor system is provided, the method, performed by a network node, comprises: receiving data comprising data representing an identity of a wireless key and data representing a location of the wireless key; detecting that the wireless key resides in a predefined location; identifying the conveyor system and the entity of the conveyor system on a basis of data representing the predefined location; determining status of an identified conveyor system; determining an access right with the wireless key to an identified entity of the conveyor system on a basis of the identity the wireless key; generating, in accordance with a determined status and a determined access right, a control signal to cause one of the following: (i) a grant of an access to the entity of the conveyor system, (ii) a refusal of an access to the entity of the conveyor system.

A detection that the wireless key resides in the predefined location may be performed by at least one of: positioning the wireless key in a space the entity resides; based on data carried in a signal received from a reader device of the conveyor system in response to a communication between the reader device and the wireless key.

The access right with respect to the entity may be determined by inquiring the access right from a database with the data identifying the wireless key.

The status information of the conveyor system may be inquired from at least one of: a database accessible by the network node; a conveyor controller.

The control signal causing the grant of the access to the entity of the conveyor system may comprise an instruction to unlock a lock of the entity of the conveyor system. For example, the control signal may be generated to the lock by one of: through a direct communication between the network node and the lock; through an indirect communication between the network node and the lock through the conveyor controller. For example, the lock ay be an electric lock of at least one of the following: a control panel, a car operating panel, a car roof door.

The control signal causing the refusal of the access to the entity of the conveyor system may comprise an instruction to generate an indication to indicate the refusal by at least one of: the lock of the entity of the conveyor system; the reader device of the conveyor system; the wireless key. For example, the control signal to generate an indication to indicate the refusal to the at least one of: the lock; the reader device may be generated by one of: through a direct communication between the network node and the at least one of: the lock; the reader device; or through an indirect communication between the network node and the at least one of: the lock; the reader device through the conveyor controller.

For example, the access may be granted to a user interface for reporting of at least one pit task in response to a detection that the wireless key resides at a pit. Alternatively or in addition, the access may be granted to an elevator car inspection drive in response to a detection that the wireless key resides on an elevator car roof. Still further, the access may be granted to perform a test emergency call in response to a detection that the wireless key resides in the elevator car.

According to a second aspect, a network node for determining an access right to an entity of a conveyor system is provided, the network node comprising: at least one processor; at least one memory including computer program code; the at least one memory and the computer program code configured to, with the at least one processor, cause the network node to perform: receive data comprising data representing an identity of a wireless key and data representing a location of the wireless key; detect that the wireless key resides in a predefined location; identify the conveyor system and the entity of the conveyor system on a basis of data representing the predefined location; determine status of an identified conveyor system; determine an access right with the wireless key to an identified entity of the conveyor system on a basis of the identity the wireless key; generate, in accordance with a determined status and a determined access right, a control signal to cause one of the following: (i) a grant of an access to the entity of the conveyor system, (ii) a refusal of an access to the entity of the conveyor system.

The network node may be arranged to perform a detection that the wireless key resides in the predefined location by at least one of: positioning the wireless key in a space the entity resides; based on data carried in a signal received from a reader device of the conveyor system in response to a communication between the reader device and the wireless key.

The network node may be arranged to determine the access right with respect to the entity by inquiring the access right from a database with the data identifying the wireless key.

The network node may be arranged to inquire the status information of the conveyor system from at least one of: a database accessible by the network node; a conveyor controller.

Still further, the network node may be arranged to generate the control signal causing the grant of the access to the entity of the conveyor system by adding an instruction to unlock a lock of the entity of the conveyor system in the control signal. For example, the network node may be arranged to generate the control signal to the lock by one of: through a direct communication between the network node and the lock; through an indirect communication between the network node and the lock through the conveyor controller. For example, the network node may be arranged to generate the control signal to the lock being an electric lock of at least one of the following: a control panel, a car operating panel, a car roof door.

The network node may be arranged to add to the control signal causing the refusal of the access to the entity of the conveyor system an instruction to generate an indication to indicate the refusal by at least one of: the lock of the entity of the conveyor system; the reader device of the conveyor system; the wireless key. For example, the network node may be arranged to generate the control signal to generate an indication to indicate the refusal to the at least one of: the lock; the reader device by one of: through a direct communication between the network node and the at least one of: the lock; the reader device; or through an indirect communication between the network node and the at least one of: the lock; the reader device through the conveyor controller.

For example, the network node may be arranged to grant the access to a user interface for reporting of a pit task in response to a detection that the wireless key resides at a pit. Alternatively or in addition, the network node may be arranged to grant the access to an elevator car inspection drive in response to a detection that the wireless key resides on an elevator car roof. Still further, the network node may be arranged to grant the access to perform a test emergency call in response to a detection that the wireless key resides in the elevator car.

According to a third aspect, a computer program product for determining an access right to an entity of a conveyor system is provided which computer program product, when executed by at least one processor, cause a network node to perform the method according to the first aspect as described above.

According to a fourth aspect, a conveyor system is provided, the conveyor system comprising: an entity, and a network node according to the second aspect above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically an example of an environment in which the present invention may be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
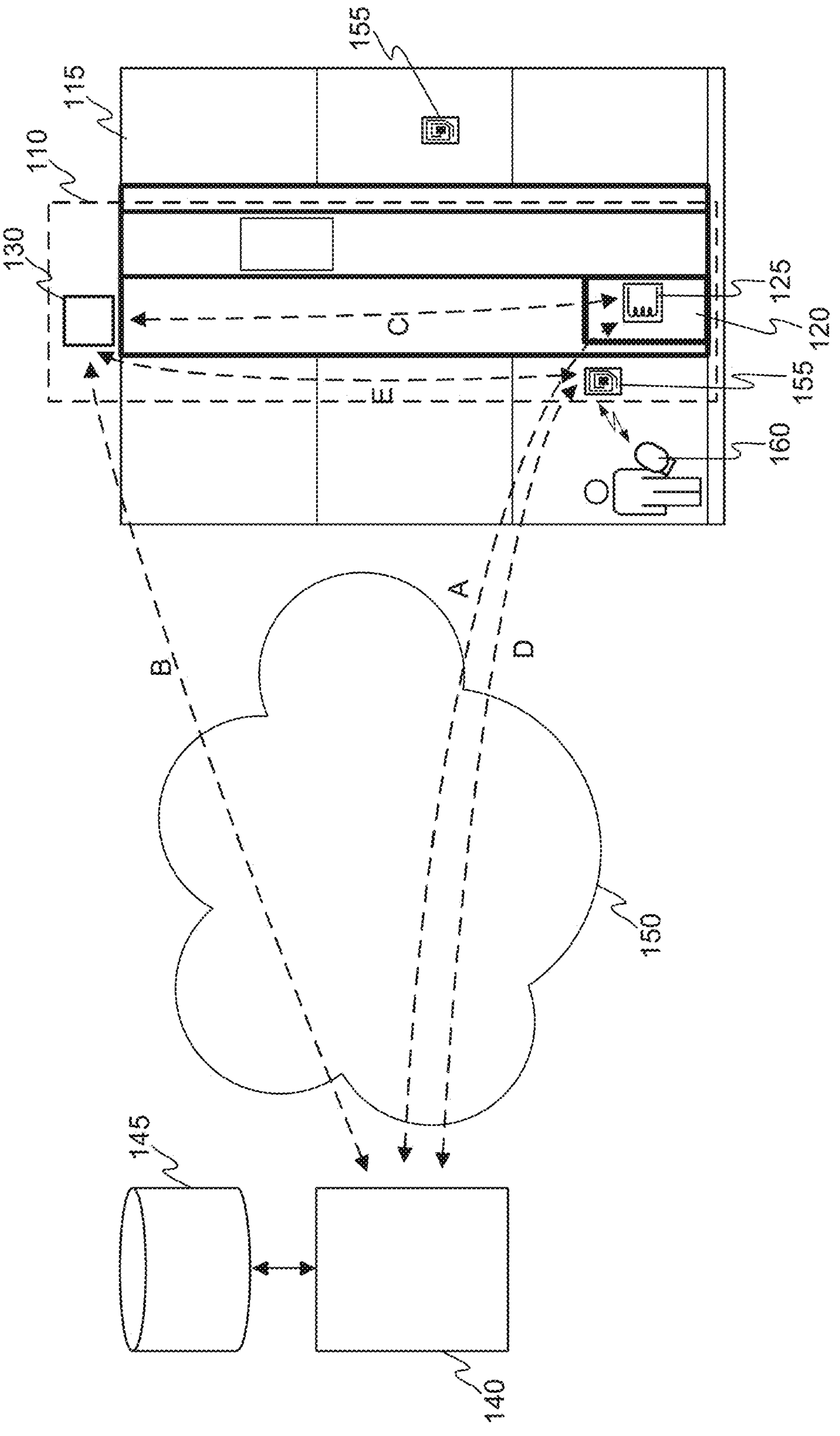

FIG. 1 illustrates schematically an example of an environment in which the present invention may be implemented to. The environment comprises a conveyor system 110 implemented in a building 115. The conveyor system 110 may e.g. be an elevator system, as illustrated in FIG. 1, an escalator, or a moving walkway, for example. In the forthcoming description of the present invention the conveyor system 110 is mainly considered to be an elevator system, but the aspects of the present invention are directly applicable in the other conveyor system. The conveyor system 110 may comprise a number of entities 120 whose access is controlled by a lock 125. Such entities 125 may e.g. reside in elevator cars, shafts or in the buildings. Some non-limiting examples of the entities may e.g. be control panels, doors used for accessing some parts of the conveyor system, such as car roof doors, machinery room and/or control units residing behind locked doors. The lock 125 in the context of the present invention is an electric lock which may communicate at least with other parts of the conveyor system 110, such as with a network node 140 accessible directly through a communication network 150 (communication route referred with A in FIG. 1) or indirectly through other entities, such as through a conveyor controller 130 (communication routes referred with B and C in FIG. 1). The network node 140 may be communicatively connected to other entities, such as one or more databases 145. The network node 140 may be arranged to operate in the manner as will be described in the forthcoming description as a standalone device or as a distributed computing environment in which a plurality of network nodes, i.e. computing devices, may be arranged to operate together e.g. as a cloud computing environment to implement the functionality as will be described in the forthcoming description.

Furthermore, the conveyor system 110 may comprise a number of reader devices 155 communicatively connected to the network node 140 either directly (communication route referred with D in FIG. 1) or indirectly through other entities, such as through a conveyor controller 130 (communication routes referred with B and E in FIG. 1) or a control device controlling an operation of the number of reader devices 155. The reader device 155 may be understood as a device comprising necessary hardware and software to communication with a wireless key 160 over an electro-magnetic radiation. In other words, the communication between the reader device 155 and the wireless key 160 may be implemented in wireless manner e.g. utilizing some short-range wireless communication technology, such as RFID technology or a Bluetooth®.

The wireless key 160, in turn, shall be understood, in an embodiment as schematically illustrated in FIG. 1, as a device arranged to communicate at least with the reader device 155 in response to entering in a vicinity of the reader device 155. The communication capability is defined by the communication technology applied to the communication i.e. by that the entities are within a communication range of the applied communication technology from each other. The wireless key 160 may, as well comprise, other capabilities, such as other communication capabilities. For example, the wireless key may comprise necessary hardware and software to communicate with the network node 140 over a communication channel established over the communication network 150. The wireless key 160 may be implemented as a single device or as a pair of devices, such as a key device communicatively connected to a mobile terminal wherein the mobile terminal may be arranged to implement the communication towards the communication network 150. Naturally, in such an embodiment an appropriate application software may be installed in the mobile terminal in order to communicate with the key device and the communication network 150 in a manner as will be described. For sake of clarity it is worthwhile to mention that the wireless key 160 may be implemented with a mobile terminal device, being e.g. a mobile phone, a tablet device, a laptop computer, smart glasses, a smart watch or anything similar.

For at least some purposes of the invention it is necessary to be able to determine a position of the wireless key 160 and in the system as schematically illustrated in FIG. 1 as a non-limiting embodiment of the invention the position of the wireless key 160 may be determined through the communication with the reader devices 155 whose position is known.

In some other embodiments of the invention in which the wireless key 160 is equipped with such a technology that its position may be determined in a required accuracy the implementation of the system does not necessarily require the reader devices 155 especially if the network node 140 is arranged to monitor the position of the wireless key with respect to a number of locks 125. In other words, the building 115, or at least some parts of it, may be equipped with indoor positioning system with whom the wireless key 155 may be arranged to communicate with for providing position information to the network node 140. Alternatively or in addition, the indoor positioning system may be arranged to provide position information of the wireless key 155 to the network node 140 with other information and in such an implementation the indoor positioning system may comprise a number of devices corresponding to the reader devices 155 of FIG. 1 for determining the position and delivering the position information with other data to the network node 140. As said, for implementing at least some parts of the present invention it is necessary to be able to determine the position of the wireless key 155.

For sake of completeness, it is worthwhile to mention that the communication network 150 may, for example, be arranged to implement any mobile communication technology, such as 3G, 4G or 5G communication technology, in order to provide a communication channel with the communicating entities which are equipped with necessary hardware and software to implement the communication. Alternatively or in addition, the communication network 150 may be implemented with a wired communication technology, such as using any data network like Internet.

Still further, the network node 140 may be arranged to communicate with the conveyor system 110, such as with the conveyor controller 130 of the conveyor system 110. With the communication the network node 140 may obtain status information of the conveyor system 110 for the purpose of the invention as will be described in the forthcoming description.

Figure 2:
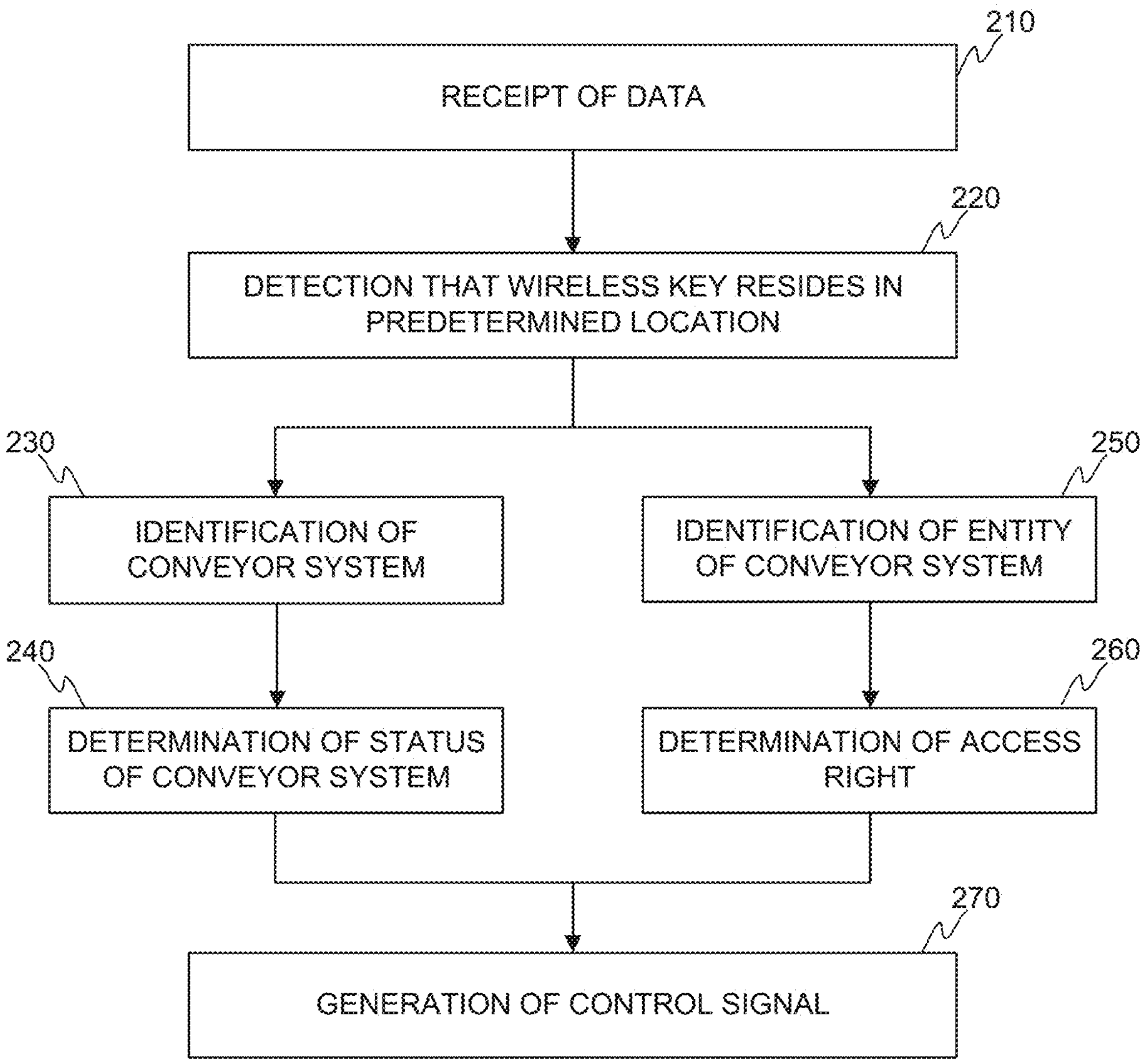
FIG. 2 illustrates schematically an example embodiment of a method according to the invention.

Next, some further aspects of the invention are now described by referring to FIG. 2 illustrating schematically an example embodiment of the method according to the invention. The method may be performed for determining an access right to an entity of a conveyor system 110. The method as schematically illustrated in FIG. 2 is shown from a network node point of view. First, the network node may receive data 210. The received data may at least comprise data representing an identity of a wireless key 160 and data representing a location of the wireless key 160.

According to an example embodiment of the invention the data received by the network node 140 may be generated by a detection system implemented in a space the conveyor system 110 resides. The detection system may comprise a number of reader devices 155 configured to communicate with the wireless key 160. In accordance, with an example embodiment the reader devices 155 may receive, through the communication at least data representing an identity of the wireless key 160. The identity of the wireless key 160 may be represented in any manner, such any data string, stored in a memory of the wireless key 160 and transmitted, e.g. by broadcasting, to the reader device 155 in the communication. In response to the receipt of the identity data of the wireless key 160 the reader device 155 may prepare a data record for transmitting it to the network node 140. The data record may comprise the identity of the wireless key 160 in question as well as data identifying the reader device 155. The data record may be transmitted to the network node 140 directly from the reader device 155 or indirectly through a control device controlling the reader devices 155 in the space, e.g. in the building, or through a conveyer controller 130 for example. If the data is transmitted to the network node 140 through another entity, the respective entity may include further data, such as its identity, to the data record.

In accordance with another example embodiment of the invention the data received by the network node 140 may be generated by a positioning system implemented in the space in question. The positioning system may be an indoor positioning system or outdoor positioning system wherein the first is preferably used in buildings and similar whereas the latter system is applicable in outdoor spaces wherein the conveyor system 110 may be implemented to. The aspects relating to the present invention are now described in an environment into which an indoor positioning system is established. The indoor positioning system may comprise a number of access points with whom the wireless key 160 communicate with. Based on the communication the indoor positioning system may e.g. collect the identity of the wireless key 160, but also to determine its position within the space in an accuracy of the indoor positioning system. The indoor positioning system may generate a data record comprising at least the identity of the wireless key 160 and data representing the location of the wireless key 160 within the space and transmit it directly to the network node 140 through an established communication channel or indirectly through other entities, such as a control device of the indoor positioning system and/or conveyor controller 130, for example.

Alternatively or in addition, if the wireless key 160 is equipped with a communication means for communicating with the network node 140, the wireless key 160 may be arranged, on a basis of received signals from the indoor positioning system, to generate a data record comprising its identity as well as data representing its location within the space 115. The data representing the location of the wireless key 160 may be a calculated position by the wireless key 160 from the received signals from the indoor positioning system or the raw data received from the indoor positioning system, such as signal strength values of signals received by the wireless key 160 from a plurality of beacon devices.

Next, in step 220 the network node 140 is arranged to perform a detection if the wireless key 160 resides in a predefined location. The detection 220 may be performed so that the network node 140 may be arranged to compare the data representing the location of the wireless key 160 either directly or by modifying the data through predefined calculation process into a form being suitable to be used in the comparison to one or more comparison values representing predefined location(s) in the space 115. The comparison may e.g. be performed so that network node 140 may inquire from a database 145 if there is predefined location area consisting of one or more locations covering the location of the wireless key 160. This may e.g. be implemented so that the location of the wireless key 160 is provided as a parameter in the inquiry to the database 145, which performs the comparison and gives response to the network node 140 in a predetermined manner. Fundamentally thinking, a detection that the location of the wireless key 160 is within the predefined area(s) means that the network node 140 may continue the method to determine the access right. On the other hand, if there is no match with the location of the wireless key 160 and the predefined locations the process may be discontinue because there is no need to give any special attention to the wireless key 160. Such a conclusion may also occur in a situation that the wireless key 160 is e.g. detected by a reader device 155 defined not being relevant from the wireless key 160 in question point of view even if the network node 140 receives information of the detection.

In the following it is assumed that a result of the comparison indicates that the wireless key 160 resides in the predefined location. Then, as schematically illustrated in FIG. 2, the network node 140 may be arranged to identify 230 the conveyor system 110 and identify 250 an entity 120 of the conveyor system 110 on a basis of data representing the predetermined location. The identification of the mentioned entities may be performed so that it is inquired from a database 145, e.g. by including data representing the position in the inquiry, identification information of the conveyor system 110 and identification information of the entity 120 of the conveyor system 110. The database 145 may return, in response to a detection of a match of the locations of the wireless key 160 and a respective conveyor system 110 in the space as well as at least one entity 120 of the conveyor system 110. In other words, the result is to determine the identity of the conveyor system 110 and the identity of the at least one entity 120 in accordance with the location of the wireless key 160. In some embodiments the at least one entity 120 may be associated to the conveyor system 110, and the database may return the identity of the at least one entity 120 based on a detection of the conveyor system 110. It is also worthwhile to mention that the conveyor system 110, and especially the at least one entity 120 may be detected or identified so that it resides close to the location of the wireless key 160, but this is not necessary the basis for identification.

In step 240, the network node 140 may be arranged to generate a signal to the conveyor system 110 to determine status of the conveyor system 110. In other words, based on the identity of the conveyor system 110 the network node 140 may generate an inquiry towards a respective entity, such as the database 145 or the conveyor controller 130 or to a database through the conveyor controller 130, to receive status information on the conveyor system 110. The inquiry to the database 145 may be performed on the basis of the identity information of the conveyor system 110. If the inquiry is performed to the conveyor controller 130, the database 145 may have returned together with the identity of the conveyor system 110 further data, such as a network address of the conveyor controller 130 and other instructions, for reaching the conveyor controller 130 in order to inquire the piece of information of the status. The status information may e.g. indicate if the conveyor system is in use or not, if there is indicated any failure reports of an operation of the conveyor system, or any similar information on the status of the conveyor system 110. The status information is in accordance with at least some embodiments of the invention such that it is to be taken into account in a determination if an access to the entity may be allowed or not, e.g. if the conveyor system 110 is in use, the access may be prevented.

Moreover, since the network node 140 is aware of the at least one entity 120 associated in some manner to the location of the wireless key 160 as a result of step 250 and since it is also aware of the identity of the wireless key 160 due to procedure described in the context of the step 220, the network node 140 may be arranged to inquire from the database 145 if there is an access right based on the wireless key 160 to the entity of the conveyor system 110. In other words, an inquiry may be performed to the database 145 wherein the inquiry comprises the identity of the wireless key 160 and the identity of the entity in question as parameters in order to determine it the wireless key 160 allows accessing the entity or not. The database 145 may determine the access right based on the received pieces of information and return a response expressing the status with respect to the access right.

For sake of clarity it should be noted that the steps of the identification 230 of the conveyor system 110 and the determination of status of the conveyor system 110 may be performed at least in part concurrently to the steps of the identification 250 of the entity 120 and the determination 260 of the access right, or consecutively to each other.

Next, in response to that the network node 140 has determined, or collected, the necessary pieces of information it may be arranged to generate, in accordance with a determined status and a determined access right, a control signal to cause one of the following: (i) a grant of an access to the entity 120 of the conveyor system 110, (ii) a refusal of an access to the entity 120 of the conveyor system 110. The generation of the control signal may e.g. be performed so that a signal indicating the grant of the access to the entity 120 is generated only if the wireless key 160 is authorized to access the entity 120 and the status of the conveyor system 110 is such that the access to the entity 120 may be performed. In all other situations such a control signal is generated which indicates the refusal of the access to the entity 120 of the conveyor system 110. In accordance with the type of the generated control signal it may be directed to different entities. For example, if a grant of the access to the entity is determined, the control signal may be generated, e.g. composed and transmitted, to a lock 125 of the entity 120 in question. The control signal may cause the lock 125 to unlock i.e. a person, such as a technician, carrying the wireless key 160 may access the entity. For example, a door may be opened, and the technician may enter a space to perform maintenance work. In addition to this, a control signal may be generated to the wireless key 160, if it is equipped with a communication means, in order to inform the carrier of the wireless key 160 that the access right is granted. On the other hand, if the network node 140 determines that no access right may be given and it is arranged to generate the signal expressing the refusal, the control signal may be generated, i.e. composed and transmitted, e.g. towards the wireless key 160 if it is equipped with a communication means, or e.g. towards a reader device 155 which generated the detection of the wireless key 160. In such a case the respective entity receiving the control signal indicating the refusal is advantageously equipped with application input/output devices, such as a control light or a loudspeaker or any similar, which may be activated with the control signal to show the user of the wireless key 160 the refusal.

In accordance with some example embodiments the term “lock” may refer to a lock implemented with software means. In other words, an entity, such as a control panel or a car operating panel, may be locked so that $3^{rd}$ parties may not access to configuration settings of the panel when e.g. entering in an elevator car. Contrary to that the method according to an embodiment of the present invention may operate so that if the outcome of the method is that an access right is given to the control panel or the car operating panel, or to any similar entity 120, the car operating panel is set to a configuration mode for allowing the technician the access to modify the configuration of the panel. In other words, a lock implemented with computer program means may be unlock. Hence, the entity 120 locked with the software means in such a context may e.g. refer to a user interface which may be opened i.e. access to certain features, such as the configuration settings, may be provided in response to a detection of the wireless key 160 in the manner as described.

The solution according to some embodiments of the invention may be implemented so that different wireless keys 160 may be provided with different access rights with respect to the entity 120 of the conveyor system 110. Hence, certain wireless key 160 may be provided with dedicated access rights to the wireless key 160 and some other wireless key 160 may be provided with other dedicated access rights. For example, in case the lock refers to software implemented lock e.g. in a context where the entity is the user interface of the car operating panel different wireless keys 160 may provide different levels of access rights with respect to a configuration of the car operating panel. For example, with a first wireless key 160 a technician may access to first set of configuration settings of the conveyor system 110 whereas with a second wireless key 160 the technician may access to a second set of configuration settings of the conveyor system 110.

In accordance with some example embodiments the control signal may be generated, such as to unlock, a lock 125 being an electric lock of at least one of the following: a control panel, a car operating panel, a car roof door. According to some further example embodiment an access right may be granted, or refused, as an outcome of the method, to a user interface for reporting of at least one pit task in response to a detection that the wireless key 160 resides at a pit. The user interface may e.g. be a display in an elevator car or even in a user terminal carried by the technician residing in the pit. Alternatively or in addition, the access may be granted, as an outcome of the method, to perform an elevator car inspection drive in response to a detection that the wireless key 160 resides on an elevator car roof. Still further, the access may be granted, as an outcome of the method, to perform a test emergency call in response to a detection that the wireless key 160 resides in the elevator car. For example, the test emergency call may be performed with the car operating panel residing in the elevator car in which the wireless key 160 is detected to reside. Naturally, the above described situations may occur when other aspects of the method are also fulfilled to. For example, the status of an identified conveyor system shall be a predetermined, such as it is not in use or it is set to a maintenance mode, and the wireless key shall comprise rights to access the respective entities as described.

Still further, especially in example embodiments of the invention in which a position of the wireless key 160 may be monitored and determined in an appropriate accuracy it is possible to provide access to certain features, such as configuration settings, e.g. with a device carried along with the wireless key 160, or a device also implementing the characteristics of the wireless key 160. Hence, a location dependent access right provisioning may be implemented to. For example, if a technician has entered a roof of an elevator car of the conveyor system 110, his/her position may be determined and detected and as a result an access to an entity 120 e.g. with a first set of configuration settings may be provided to the technician carrying a respective wireless key 160. In this kind of implementation the configuration settings, or any similar, may be such that the technician may see an effect of the configuration only in the detected position. Similarly, other access rights may be provided in some other positions. The above kind of approach also allows a remote monitoring of the technician which may be implemented in order to fulfil security requirements e.g. operations to be performed.

As may be derived from the foregoing description the present invention enables a wide variety of sophisticated possibilities to improve a technician work as well as improve a security in an area of conveyor systems 110.

Figure 3:
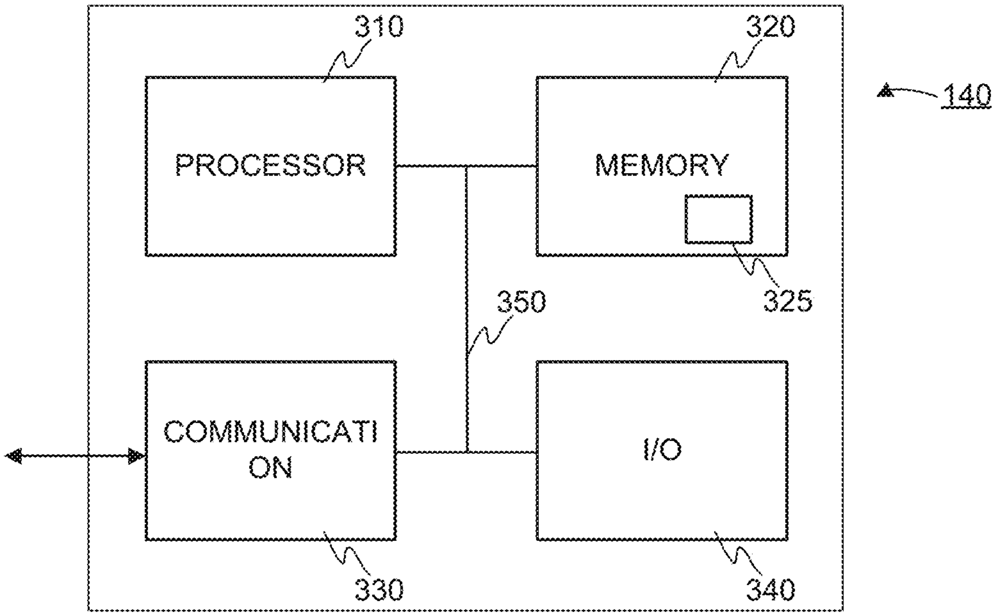
FIG. 3 illustrates schematically as a block diagram an example embodiment of a network node according to the invention.

As discussed above, a network node 140 arranged to perform a determination of an access right in a manner as described. FIG. 3 illustrates schematically as a block diagram a non-limiting example of the network node 140 applicable to perform the method. The block diagram of FIG. 3 depicts some components of an apparatus that may be employed to implement an operation of the network node. The apparatus comprises a processor 310 and a memory 320. The memory 320 may store data and computer program code 325. The apparatus may further comprise communication means 330 for wired and/or wireless communication with other apparatuses, such as other network nodes, entities of the conveyor system itself as well as databases and any other entities. Furthermore, I/O (input/output) components 340 may be arranged, together with the processor 310 and a portion of the computer program code 325, to provide a user interface for receiving input from a user and/or providing output to the user of the system and the network node 140 when necessary. In particular, the user I/O components may include user input means, such as one or more keys or buttons, a keyboard, a touchscreen, or a touchpad, etc. The user I/O components may include output means, such as a display or a touchscreen. The components of the apparatus may be communicatively coupled to each other via a bus 350 that enables transfer of data and control information between the components.

The memory 320 and a portion of the computer program code 325 stored therein may be further arranged, with the processor 310, to cause the apparatus, i.e. the network node 140 to perform a method as described in the foregoing description. The processor 310 may be configured to read from and write to the memory 320. Although the processor 310 is depicted as a respective single component, it may be implemented as respective one or more separate processing components. Similarly, although the memory 320 is depicted as a respective single component, it may be implemented as respective one or more separate components, some or all of which may be integrated/removable and/or may provide permanent/semi-permanent/dynamic/cached storage.

The computer program code 325 may comprise computer-executable instructions that implement functions that correspond to steps of the method when loaded into the processor 310. As an example, the computer program code 325 may include a computer program consisting of one or more sequences of one or more instructions. The processor 310 is able to load and execute the computer program by reading the one or more sequences of one or more instructions included therein from the memory 320. The one or more sequences of one or more instructions may be configured to, when executed by the processor 310, cause the apparatus to perform the method be described. Hence, the apparatus may comprise at least one processor 310 and at least one memory 320 including the computer program code 325 for one or more programs, the at least one memory 320 and the computer program code 325 configured to, with the at least one processor 310, cause the apparatus to perform the method as described.

The computer program code 325 may be provided e.g. a computer program product comprising at least one computer-readable non-transitory medium having the computer program code 325 stored thereon, which computer program code 325, when executed by the processor 310 causes the apparatus to perform the method. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Still further, the computer program code 325 may comprise a proprietary application, such as computer program code for executing the determination of an access right in the manner as described.

Any of the programmed functions mentioned may also be performed in firmware or hardware adapted to or programmed to perform the necessary tasks.

Moreover, as mentioned a functionality of the network node 140 may be shared between a plurality of devices as a distributed computing environment. For example, the distributed computing environment may comprise a plurality of network nodes as schematically illustrated in FIG. 3 arranged to implement the method in cooperation with each other in a predetermined manner. For example, each device may be arranged to perform one or more method steps and in response to a finalization of its dedicated step in may hand a continuation of the process to the next device.

In the foregoing description it is referred to the database 145 in a context of a plurality of method steps. For sake of clarity, it is worthwhile to mention that the database 145 may be arranged to maintain a plurality of data structures storing different types of data, such as the mentioned types of data inquired from the database 145. However, this does not limit the present invention so that only one database 145 may be used for, but it is also possible that a plurality of database systems are harnessed to maintain the respective data structures and the network node 140 is configured so that it is aware of the plurality of databases 145 for inquiring the necessary piece of information from a correct database.

Figure 4:
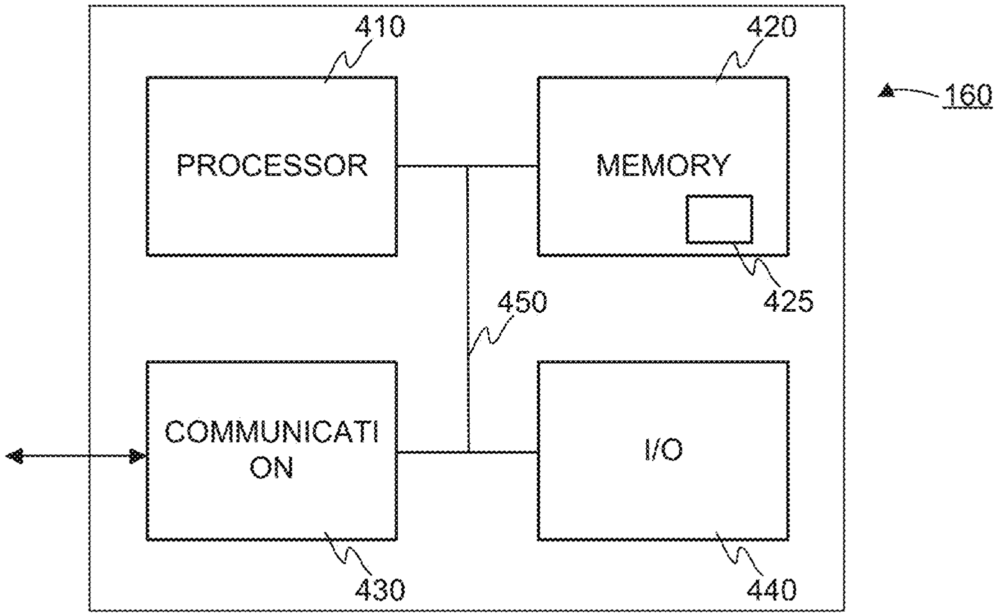
FIG. 4 illustrates schematically as a block diagram an example embodiment of a wireless key according to the invention.

Still further, FIG. 4 illustrates schematically as a block diagram a non-limiting example of the wireless key 160. The block diagram of FIG. 4 depicts some components of an apparatus that may be employed to implement an operation of the wireless key. The apparatus comprises a processor 410 and a memory 420. The memory 420 may store data and computer program code 425. The apparatus may further comprise communication means 430 for at least wireless communication with other apparatuses or systems, such as a network node 140, reader devices 125, other entities of the system, such as positioning systems and the like. Furthermore, I/O (input/output) components 440 may be arranged, together with the processor 410 and a portion of the computer program code 425, to provide a user interface for receiving input from a user and/or providing output to the user of the wireless key 160 when necessary. In particular, the user I/O components may include user input means, such as one or more buttons, a keyboard, a touchscreen, or a touchpad, etc. The user I/O components may include output means, such as a display or a touchscreen or light emitting devices or loudspeakers. The components of the apparatus may be communicatively coupled to each other via a bus 450 that enables transfer of data and control information between the components.

The system for determining the access right may comprise at least the network node 140 as described, one or more databases 145, a conveyor system 110 comprising at least one entity 120 to which the access is limited with some sort of locking means 125 and a detection system for monitoring a location of the wireless key 160 and a wireless key 160. At least the mentioned entities may be arranged to communicate with each other either directly or indirectly with an applicable communication technology. The communication technology may be implemented in a wireless or wired manner. In case the wireless communication technology is applied to a short-range wireless communication technology and a wide-range communication technology may be used in accordance with the need. In some embodiments e.g. the detection system may not, by definition, belong to the conveyor system 110, but it may provide necessary data to the conveyor system 110, or at least to the network node 140 for performing the method.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method, performed by a network node, for determining an access right to a first entity of a first conveyor system, the method comprising:

receiving data representing an identity of a wireless key and data representing a location of the wireless key;

detecting whether the wireless key resides in a first location;

identifying the first conveyor system and the first entity as a conveyor system and entity proximate to the wireless key based on the data representing the location of the wireless key, the identifying the first conveyor system and the first entity being performed in response to detecting that the wireless key resides in the first location;

determining a status of the first conveyor system;

determining the access right based on the data representing the identity the wireless key, the access right corresponding to a right of the wireless key to provide access to the first entity; and generating a control signal based on the status of the first conveyor system and the access right, the control signal causing a grant of access to the first entity, or a refusal of the access to the first entity.

2. The method of claim 1, wherein the detecting whether the wireless key resides in the first location is performed by positioning the wireless key in a space in which the first entity resides; or based on data carried in a signal received from a reader device of the first conveyor system in response to a communication between the reader device and the wireless key.

3. The method of claim 1, wherein the determining the access right comprises inquiring a database for the access right using the data representing the identity of the wireless key.

4. The method of claim 1, wherein the determining the status of the first conveyor system comprises inquiring the status from at least one of:

a database accessible by the network node or a conveyor controller.

5. The method of claim 1, wherein the control signal causes the grant of the access to the first entity, the control signal including an instruction to unlock a lock of the first entity.

6. The method of claim 5, further comprising:

transmitting the control signal the lock by one of a direct communication between the network node and the lock, or an indirect communication between the network node and the lock through a conveyor controller.

7. The method of claim 5, wherein the lock is an electric lock of at least one of a control panel, a car operating panel, or a car roof door.

8. The method of claim 1, wherein the control signal causes the refusal of the access to the first entity, the control signal including an instruction to generate an indication indicating the refusal, and the control signal causing at least one of a lock of the first entity, a reader device of the first conveyor system or, the wireless key to generate the indication.

9. The method of claim 8, further comprising:

transmitting the control signal by one of:

a direct communication between the network node and the at least one of the lock, the reader device, or the wireless key, or an indirect communication between the network node and the at least one of the lock, the reader device, or the wireless key through a conveyor controller.

10. The method of claim 1, wherein the control signal causes the grant of the access to the first entity, the data representing the location of the wireless key representing that the wireless key resides at a pit, and the first entity being a user interface for reporting at least one pit task.

11. The method of claim 1, wherein the control signal causes the grant of the access to the first entity, the data representing the location of the wireless key representing that the wireless key resides on an elevator roof, and the first entity being an elevator car inspection drive.

12. The method of claim 1, wherein the control signal causes the grant of the access to the first entity, the data representing the location of the wireless key representing that the wireless key resides in an elevator car, and the grant of access to the first entity enabling performance of a test emergency call.

13. A network node for determining an access right to a first entity of a first conveyor system, comprising:

at least one memory including computer program code; and at least one processor configured to execute the computer program code to cause the network node to receive data representing an identity of a wireless key;

and data representing a location of the wireless key, detect whether the wireless key resides in a first location, identify the first conveyor system and the first entity as a conveyor system and an entity proximate to the wireless key based on the data representing the location of the wireless key, the first conveyor system and the first entity being identified in response to detecting that the wireless key resides in the first location, determine a status of the first conveyor system, determine the access right based on the data representing the identity the wireless key, the access right corresponding to a right of the wireless key to provide access to the first entity, generate a control signal based on the status of the first conveyor system and the access right, the control signal causing a grant of access to the first entity, or a refusal of the access to the first entity.

14. The network node of claim 13, wherein at least one processor configured to execute the computer program code to cause the network node to detect whether the wireless key resides in the first location by positioning the wireless key in a space in which the first entity resides, or based on data carried in a signal received from a reader device of the first conveyor system in response to a communication between the reader device and the wireless key.

15. The network node of claim 13, wherein at least one processor configured to execute the computer program code to cause the network node to determine the access right by inquiring a database for the access right using the data representing the identity of the wireless key.

16. The network node of claim 13, wherein at least one processor configured to execute the computer program code to cause the network node to determine the status of the first conveyor system from at least one of:

a database accessible by the network node or a conveyor controller.

17. The network node of claim 13, wherein at least one processor configured to execute the computer program code to cause the network node is arranged to generate the control signal causing the grant of the access to the first entity by including an instruction to unlock a lock of the first entity in the control signal.

18. The network node of claim 17, wherein at least one processor configured to execute the computer program code to cause the network node to transmit the control signal to the lock by one of:

a direct communication between the network node and the lock, or an indirect communication between the network node and the lock through a conveyor controller.

19. The network node of claim 17, wherein the lock is an electric lock of at least one of a control panel, a car operating panel, or a car roof door.

20. The network node of claim 13, wherein at least one processor configured to execute the computer program code to cause the network node to generate the control signal causing the refusal of the access to the first entity by including an instruction to generate an indication indicating the refusal, the control signal causing at least one of a lock of the first entity, a reader device of the first conveyor system, or the wireless key to generate the indication.

21. The network node of claim 20, wherein at least one processor configured to execute the computer program code to cause the network node to transmit the control signal by one of:

a direct communication between the network node and the at least one of the lock, the reader device, or the wireless key, or an indirect communication between the network node and the at least one of the lock, the reader device, or the wireless key through a conveyor controller.

22. The network node of claim 13, wherein at least one processor configured to execute the computer program code to cause the network node to generate the control signal causing the grant of the access to the first entity, the data representing the location of the wireless key representing that the wireless key resides at a pit, and the first entity being a user interface for reporting a pit task.

23. The network node of claim 13, wherein at least one processor configured to execute the computer program code to cause the network node to generate the control signal causing the grant of the access to the first entity, he data representing the location of the wireless key representing that the wireless key resides on an elevator roof, and the first entity being an elevator car inspection drive.

24. The network node of claim 13, wherein at least one processor configured to execute the computer program code to cause the network node to generate the control signal causing the grant of the access to the first entity, the data representing the location of the wireless key representing that the wireless key resides in an elevator car, and the grant of access to the first entity enabling performance of a test emergency call.

25. A conveyor system, comprising:

an entity, and a network node according to claim 13.

26. A non-transitory computer program product storing instructions for determining an access right to a first entity of a first conveyor system which, when executed by at least one processor, cause a network node to perform a method, the method comprising:

receiving data representing an identity of a wireless key and data representing a location of the wireless key;

detecting whether the wireless key resides in a first location;

identifying the first conveyor system and the first entity as a conveyor system and entity proximate to the wireless key based on the data representing the location of the wireless key, the identifying the first conveyor system and the first entity being performed in response to detecting that the wireless key resides in the first location;

determining a status of the first conveyor system, determining the access right based on the date representing the identity the wireless key, the access right corresponding to a right of the wireless key to provide access to the first entity; and generating a control signal based on the status of the first conveyor system and the access right, the control signal causing a grant of access to the first entity, or a refusal of the access to the first entity.

* * * * *